United States Patent
Kitamura et al.

(10) Patent No.: US 10,545,274 B2
(45) Date of Patent: Jan. 28, 2020

(54) OPTICAL DEVICE AND OPTICAL SYSTEM

(71) Applicant: OMRON Corporation, Kyoto-shi, Kyoto (JP)

(72) Inventors: Norikazu Kitamura, Osaka (JP); Masayuki Shinohara, Nagaokakyo (JP); Yasuhiro Tanoue, Otsu (JP); Mitsuru Okuda, Kusatsu (JP); Yuji Hirose, Kyotanabe (JP); Kazuyuki Okada, Ritto (JP)

(73) Assignee: OMRON Corporation, Kyoto-shi (JP)

( * ) Notice: Subject to any disclaimer, the term of this patent is extended or adjusted under 35 U.S.C. 154(b) by 95 days.

(21) Appl. No.: 15/538,897

(22) PCT Filed: Dec. 28, 2015

(86) PCT No.: PCT/JP2015/086574
§ 371 (c)(1),
(2) Date: Jun. 22, 2017

(87) PCT Pub. No.: WO2016/114104
PCT Pub. Date: Jul. 21, 2016

(65) Prior Publication Data
US 2017/0371088 A1   Dec. 28, 2017

(30) Foreign Application Priority Data

Jan. 13, 2015 (JP) ................... 2015-004534
Sep. 14, 2015 (JP) ................... 2015-181063

(51) Int. Cl.
*G02B 27/22* (2018.01)
*G02B 5/18* (2006.01)
(Continued)

(52) U.S. Cl.
CPC ......... *G02B 6/0035* (2013.01); *G02B 6/0068* (2013.01); *G02B 27/22* (2013.01);
(Continued)

(58) Field of Classification Search
CPC combination set(s) only.
See application file for complete search history.

(56) References Cited

U.S. PATENT DOCUMENTS

| 6,266,187 | B1 | 7/2001 | Dunn et al. | |
|---|---|---|---|---|
| 2004/0141590 | A1* | 7/2004 | Ihalainen | A61B 6/08 378/206 |

(Continued)

FOREIGN PATENT DOCUMENTS

| CN | 1959194 A | 5/2007 |
|---|---|---|
| CN | 101661725 A | 3/2010 |

(Continued)

OTHER PUBLICATIONS

The International Search Report of PCT/JP2015/086574 dated Mar. 22, 2016.

(Continued)

*Primary Examiner* — Thien M Le
*Assistant Examiner* — Asifa Habib
(74) *Attorney, Agent, or Firm* — Metrolex IP Law Group, PLLC

(57) ABSTRACT

An optical device includes a light-guiding plate and light sources that each emit light to the light-guiding plate. The light-guiding plate has light convergence portions, the light substantially converges at or scatters from a convergence point or line, and an image is formed by a collection of the convergence points or lines, and a light convergence portion causes light to be emitted in directions in which the light substantially converges in or scatters from a range including a point located a first distance apart from the emission surface, and a second light convergence portion causes light to be emitted in directions in which the light substantially converges in or scatters from a range including a point located a second distance, which is longer than the first distance, apart from the emission surface, and the number of (Continued)

first light convergence portions is higher than the number of second light convergence portions.

9 Claims, 7 Drawing Sheets

(51) Int. Cl.
  *F21V 8/00* (2006.01)
  *G09F 13/18* (2006.01)
  *G09F 19/12* (2006.01)
  *G09F 13/20* (2006.01)

(52) U.S. Cl.
  CPC .............. *G09F 13/18* (2013.01); *G09F 13/20* (2013.01); *G09F 19/12* (2013.01); *G02B 5/1819* (2013.01); *G02B 27/2214* (2013.01)

(56) References Cited

U.S. PATENT DOCUMENTS

| | | | |
|---|---|---|---|
| 2007/0104415 A1 | 5/2007 | Sugiura et al. | |
| 2007/0279391 A1 | 12/2007 | Marttila et al. | |
| 2010/0045694 A1 | 2/2010 | Tanaka et al. | |
| 2014/0118825 A1* | 5/2014 | Shikii ................ | G02B 27/2214 359/465 |
| 2014/0168735 A1* | 6/2014 | Yuan .................. | G02B 27/0103 359/12 |
| 2014/0268327 A1 | 9/2014 | Dunn et al. | |
| 2016/0033770 A1* | 2/2016 | Fujimaki .............. | G06T 19/006 345/8 |
| 2017/0363877 A1* | 12/2017 | Zhu ...................... | G02B 6/0035 |
| 2018/0252387 A1* | 9/2018 | Kitamura ................ | F21V 5/045 |

FOREIGN PATENT DOCUMENTS

| | | |
|---|---|---|
| JP | 2008-275922 A | 11/2008 |
| JP | 2009-540440 A | 11/2009 |
| JP | 2012-008464 A | 1/2012 |
| JP | 2012-118378 A | 6/2012 |
| JP | 5701434 B1 | 4/2015 |
| WO | 2014/152119 A1 | 9/2014 |

OTHER PUBLICATIONS

Omron Corp, Sekaihatsu Tomei Plate o Mochiita Kukan Toei Gijutsu o Kaihatsu, News Release—2014 Nen, Oct. 2, 2014, Retrieved from the Internet<URL: http://www.omron.co.jp/press/2014/10/e1002.html> [retrieval date: Mar. 11, 2016], Relevance is indicated in the (translated) International Search Report dated Mar. 22, 2016.

Mainichi Shinbun, CEATEC 2014 Omron Usui Sheet 1-mai to LED de 3D Gazo Toei, Online, Oct. 7, 2014, Retrieved from the Internet: <URL:http://mainichi.jp/articles/20141007/mog/00m/010/012000c> [retrieval date: Mar. 11, 2016], Relevance is indicated in the (translated) International Search Report dated Mar. 22, 2016.

CEATEC2014 Omron Rittai Toei Gazo, YouTube, Oct. 6, 2014, Retrieved from the Internet: <URL: https://www.youtube.com/watch?v=izkYqW0osmA> [retrieval date: Mar. 11, 2016], Relevance is indicated in the (translated) International Search Report dated Mar. 22, 2016.

Mynavi News, Omron, Mageru Koto mo Kano na Tomei Plate kara 3D Gazo o Toei suru Gijutsu o Kaihatsu, Online, Oct. 3, 2014, Retrieved from the Internet: <URL:http://news.mynavi.jp/news/2014/10/03/181/> [retrieval date Mar. 11, 2016], Relevance is indicated in the (translated) International Search Report dated Mar. 22, 2016.

Itmedia News, CEATEC Japan 2014: Tomeiita to LED 1-ko de Jitsugen suru Ukabu 3D Eizo sono Shikumi wa, Online, Oct. 7, 2014, Retrieved from the Internet: <URL:http://www.itmedia.co.jp/news/articles/1410/07/news117.html> [retrieval date Mar. 11, 2016], Relevance is indicated in the (translated) International Search Report dated Mar. 22, 2016.

RBB Today, [CEATEC 2014 vol. 13] Pop ya Annai Hyoji ga Kawaru! Omron no Kukan Toei Gijutsu, Online, Oct. 7, 2014, Retrieved from the Internet<URL:http://www.rbbtoday.com/article/2014/10/07/124175.html> [retrieval date Mar. 11, 2016], Relevance is indicated in the (translated) International Search Report dated Mar. 22, 2016.

The Chinese Office Action (CNOA) dated Nov. 5, 2018 in a counterpart Chinese Patent application.

The Japanese Office Action (JPOA) dated Jun. 4, 2019 in a counterpart Japanese patent application.

The German Office Action (DEOA) dated Sep. 19, 2019 in a counterpart German patent application.

* cited by examiner (a)

(b)

(a)

(b)

OPTICAL DEVICE AND OPTICAL SYSTEM

TECHNICAL FIELD

The present invention relates to an optical device and an optical system.

RELATED ART

A stereoscopic display apparatus is known that includes a light-guiding plate, a light source, and a mask or a lens array that is disposed on the front surface of the light-guiding plate and uses a parallax barrier system or a lens array system (see Patent Document 1, for example).

Patent Document 1: JP 2012-008464A

SUMMARY OF THE INVENTION

Problem to be Solved by the Invention

For example, if light is received from different positions on a light-entering end surface of the light-guiding plate, there are cases where the light-emission angle of light emitted from the light-guiding plate changes depending on the position at which light is received. Thus, it is not possible to make emitted light travel in a desired direction in some cases. As a result, there are cases where blur differs within a single image formed by the emitted light.

Means for Solving the Problems

In a first aspect, an optical device includes a light-guiding plate that guides light that enters the light-guiding plate in a plane parallel to an emission surface that emits light, and light sources that each emit light to the light-guiding plate from positions that are different in a direction orthogonal to a light-guiding direction in which the light-guiding plate guides light, in which the light-guiding plate has a plurality of light convergence portions that receive light guided by the light-guiding plate and each have optical surfaces that cause light to be emitted from the emission surface in directions in which the light substantially converges at one convergence point or one convergence line in a space, or substantially scatters from one convergence point or one convergence line in the space, the convergence points or the convergence lines for the plurality of light convergence portions are different from each other, and an image is formed in the space by a collection of a plurality of the convergence points or a plurality of the convergence lines, and among the plurality of light convergence portions, a first light convergence portion causes light to be emitted from the emission surface in directions in which the light substantially converges in a predetermined range including a point located a first distance apart from the emission surface, or substantially scatters from the predetermined range including the point located the first distance apart from the emission surface, and a second light convergence portion causes light to be emitted from the emission surface in directions in which the light substantially converges in a predetermined range including a point located a second distance, which is longer than the first distance, apart from the emission surface, or substantially scatters from the predetermined range including the point located the second distance apart from the emission surface, and the number of first light convergence portions is higher than the number of second light convergence portions such that a spread of an image formed by the convergence points or the convergence lines of the light emitted from the first light convergence portions approximately coincides with a spread of an image formed by the convergence points or the convergence lines of the light emitted from the second light convergence portions.

The predetermined range may be a range extending along the direction orthogonal to the light-guiding direction.

The shorter the first distance is, the higher the number of first light convergence portions that are provided.

The second light convergence portions may cause light to be emitted from the emission surface in directions in which the light substantially converges at a convergence point or a convergence line among the convergence points or the convergence lines that is located farthest from the emission surface, or substantially scatters from the convergence point or the convergence line that is located farthest from the emission surface, the convergence points or the convergence lines of the light emitted from the second light convergence portions may each have a spread in the direction orthogonal to the light-guiding direction in which the light-guiding plate guides the light, due to the light sources emitting light to the light-guiding plate at the different positions, and the larger the spread of the convergence points or the convergence lines of the light emitted from the second light convergence portions is, the higher the number of first light convergence portions that are provided.

The first light convergence portions may be provided at different positions in the direction orthogonal to the light-guiding direction.

The image formed by the collection of the convergence points or the convergence lines may be an image expressed by a line.

The plurality of light convergence portions may be formed along lines that are determined in advance in the plane parallel to the emission surface.

The higher the number of light convergence portions that each cause light to be emitted from the emission surface in directions in which the light substantially converges in a predetermined range including a point located a specific distance apart from the emission surface, or substantially scatters from the predetermined range including the point located the specific distance apart from the emission surface is, the smaller a luminous intensity of emission light per light convergence portion in the plurality of light convergence portions may be.

In a second aspect, an optical system includes the above-described optical device and a user interface unit, in which the optical device forms an image that shows a user a position of the user interface unit.

Note that the above-described summary of the invention does not describe all of the features of the present invention. Also, the invention encompasses sub-combinations of these groups of features.

EMBODIMENTS OF THE INVENTION

Although the present invention will be described by way of an embodiment of the invention hereinafter, the following embodiment does not limit the invention according to the claims. Also, all combinations of features described in the embodiment are not necessarily essential for the means for solving the problem of the invention.

Figure 1:
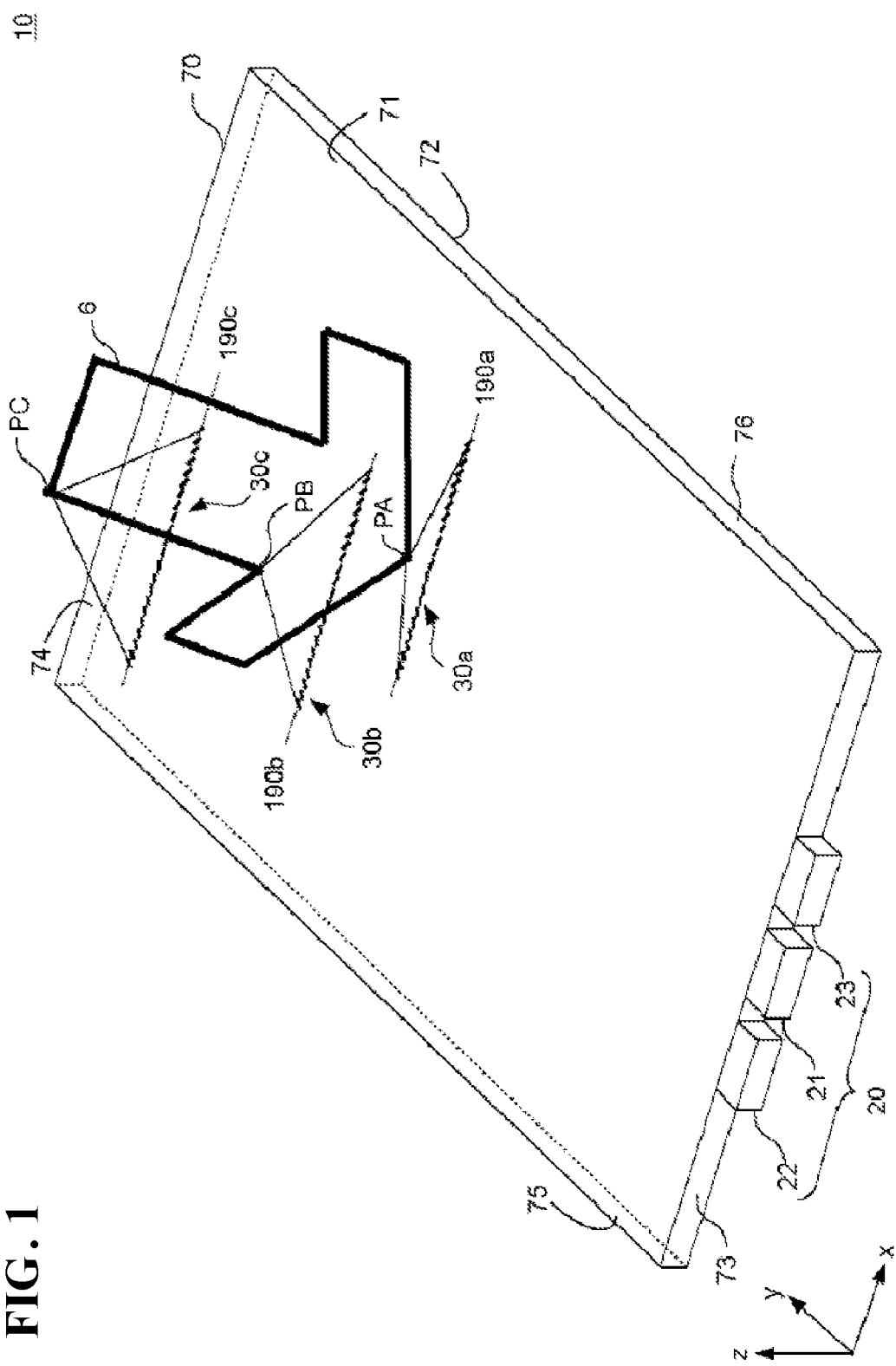
FIG. 1 schematically shows a display apparatus 10 of one embodiment together with a stereoscopic image projected in a space.

FIG. 1 schematically shows a display apparatus 10 in one embodiment together with a stereoscopic image projected in a space. Note that for the purpose of facilitating understanding of the description, the drawings used to describe the embodiment are schematic or illustrative drawings. There are cases where the drawings used to describe the embodiment are not depicted in the actual scale.

The display apparatus 10 has an emission surface 71 that emits light. The display apparatus 10 forms an image 6 as a stereoscopic image with light emitted from the emission surface 71. The image 6 is a stereoscopic image recognized by a user in a space. Note that the stereoscopic image refers to an image recognized to be located at a position that is different from the position of the emission surface 71 of the display apparatus 10. The stereoscopic image includes a two-dimensional image recognized at a position spaced apart from the emission surface 71 of the display apparatus 10, for example. That is, the stereoscopic image includes not only an image recognized as a stereoscopic shape but also an image having a two-dimensional shape recognized at a position that is different from the position on the display surface of the display apparatus 10.

The display apparatus 10 includes a light-guiding plate 70 and a light source portion 20. The light-guiding plate 70 is made from a transparent resin material having a relatively high refractive index. The material for forming the light-guiding plate 70 may be a polycarbonate resin (PC), a polymethyl methacrylate resin (PMMA), glass, or the like.

The light-guiding plate 70 has a back surface 72 opposite to the emission surface 71. Also, the light-guiding plate 70 has an end surface 73, an end surface 74, an end surface 75, and an end surface 76, which are the four end surfaces of the light-guiding plate 70. The end surface 73 is a light-entering end surface of the light-guiding plate 70. The end surface 73 is provided with the light source portion 20, and light emitted from the light source portion 20 enters the light-guiding plate 70 from the end surface 73. The end surface 74 is opposite to the end surface 73. The end surface 76 is a surface opposite to the end surface 75. The light-guiding plate 70 spreads and guides light emitted from the light source portion 20 in a planar shape in the plane parallel to the emission surface 71.

Note that in the description of the embodiment, a right-handed orthogonal coordinate system having an x axis, a y axis, and a z axis is used in some cases. The z-axis direction is defined as a direction perpendicular to the emission surface 71. The direction from the back surface 72 to the emission surface 71 is defined as the z-axis positive direction. Also, the y-axis direction is defined as a direction perpendicular to the end surface 73. The direction from the end surface 73 to the end surface 74 is defined as the y-axis positive direction. The x axis is a direction perpendicular to the end surface 75 and the end surface 76, and the direction from the end surface 75 to the end surface 76 is defined as the x-axis positive direction. Note that in order to avoid redundancy, the plane parallel to the xy flat plane is called the "xy plane", the plane parallel to the yz flat plane is called the "yz plane", and the plane parallel to the xz flat plane is called the "xz plane" in some cases.

The light source portion 20 includes a light source 21, a light source 22, and a light source 23. The light source 21, light source 22, and light source 23 are LED light sources, for example. In this manner, use of a plurality of light sources increases the brightness of the image 6. The optical axis of the light source 21, the optical axis of the light source 22, and the optical axis of the light source 23 are approximately orthogonal to the end surface 73. Herein, the positions in the x direction of the light source 21, the light source 22, and the light source 23 are different from each other. In this manner, the light source 21, the light source 22, and the light source 23 emit light onto the light-guiding plate 70 from positions that are different in the direction orthogonal to the light-guiding direction (the y-axis direction, for example) in which the light-guiding plate 70 guides light.

The back surface 72 of the light-guiding plate 70 is provided with a plurality of light convergence portions 30 including a light convergence portion 30a, a light convergence portion 30b, and a light convergence portion 30c. The light convergence portions 30 are each substantially continuous in the x-axis direction. Specifically, the light convergence portion 30a is formed along a line 190a. The light convergence portion 30b is formed along a line 190b. The light convergence portion 30c is formed along a line 190c. Here, the line 190a, the line 190b, and the line 190c are straight lines that are approximately parallel to the x axis. Each light convergence portion 30 is substantially continuous along a straight line that is approximately parallel to the x axis. Light guided by the light-guiding plate 70 enters the positions in the x-axis direction of the light convergence portions 30.

Herein, light emitted in the case where light emitted from one of the light sources 21, 22, and 23 enters the light convergence portions 30 will be described. The light convergence portions 30 make light that enters the positions of the light convergence portions 30 substantially converge at fixed points corresponding to the light convergence portions 30. In particular, FIG. 1 shows the light convergence portion 30a, the light convergence portion 30b, and the light convergence portion 30c as some of the light convergence portions 30, and shows a situation in which a plurality of light rays emitted from the light convergence portion 30a, the light convergence portion 30b, and the light convergence portion 30c converge at the light convergence portion 30a, the light convergence portion 30b, and the light convergence portion 30c.

Specifically, the light convergence portion 30a corresponds to a fixed point PA on the image 6. The light rays emitted from positions in the light convergence portion 30a converge at the fixed point PA. Therefore, the wave surface of light emitted from the light convergence portion 30a is a wave surface of light that appears to be emitted from the fixed point PA. The light convergence portion 30b corresponds to a fixed point PB on the image 6. The light rays emitted from positions in the light convergence portion 30b converge at the fixed point PB. In this manner, the light rays emitted from positions in any light convergence portion 30 substantially converge at a fixed point corresponding to that light convergence portion 30. Accordingly, a wave surface of light that appears to be emitted from a corresponding fixed point can be provided by any light convergence portion 30. The fixed points corresponding to the light convergence portions 30 are different from each other, and the image 6 recognized in the space is formed by a collection of fixed points corresponding to that light convergence portion 30. In this manner, the display apparatus 10 projects a stereoscopic image in the space. Note that as one example, the image 6 is depicted by a line, and the line depicting the image 6 is substantially formed by a collection of fixed points corresponding to the light convergence portions 30.

In the present embodiment, the light convergence portions 30 each include multiple reflection surfaces that are substantially continuous in the x-axis direction. The light that is reflected by the reflection surfaces of any light convergence portion 30 converges at a fixed point corresponding to that light convergence portion 30. For example, a plurality of light rays that are reflected by the plurality of reflection surfaces of the light convergence portion 30a converge at the fixed point PA. Also, a plurality of light rays that are reflected by the plurality of reflection surfaces of the light convergence portion 30b converge at the fixed point PB. Also, a plurality of light rays that are reflected by the plurality of reflection surfaces of the light convergence portion 30c converge at the fixed point PC.

In the xy plane, light beams that are guided by the light-guiding plate 70 and pass through respective positions in the light-guiding plate 70 have a spread angle that is smaller than a predetermined value and is centered on the direction that connects the position in the light-guiding plate 70 to the light source. If the light convergence portion 30 is provided at a position spaced apart from the light sources, light that is guided by the light-guiding plate 70 and enters the light convergence portion 30 has little spread substantially centered on the y-axis direction. Thus, for example, light emitted from the light convergence portion 30a substantially converges at one fixed point in the plane that includes the fixed point PA and is parallel to the xz plane. Note that in this specification, the spread of a light beam passing through a point located inside or outside of the light-guiding plate refers to the spread of light in the case where this light beam is regarded as light scattering from this point. Also, there are cases where the spread of the light beam passing through a point located inside or outside of the light-guiding plate is simply referred to as "spread of light".

Note that if light that enters the light convergence portion 30 has spread in the z-direction, the light emitted from the light convergence portion 30 converges on a line that includes a fixed point in a space and extends along the y axis. However, for the purpose of simply describing the embodiment, the description will be given focusing on convergence of light in the xz plane, light emitted from the light convergence portions 30 converging at fixed points.

In this manner, the light convergence portions 30 are formed along predetermined lines in the plane that is parallel to the emission surface 71. Thus, light guided by the light-guiding plate 70 enters the light convergence portions 30, and the light convergence portions 30 cause light to be emitted from the emission surface 71 in directions in which the light substantially converges at one convergence point in the space. Note that if the fixed point is located on the back surface 72 of the light-guiding plate 70, the emitted light serves as light that scatters from the fixed point. Thus, if the fixed point is located on the back surface 72 of the light-guiding plate 70, the reflection surfaces of the light convergence portions 30 cause light to be emitted from the emission surface 71 in directions in which the light substantially scatters from one convergence point in the space. Note that as will be described later, the light convergence portions 30 may be each formed by a part of a Fresnel lens.

Figure 2:
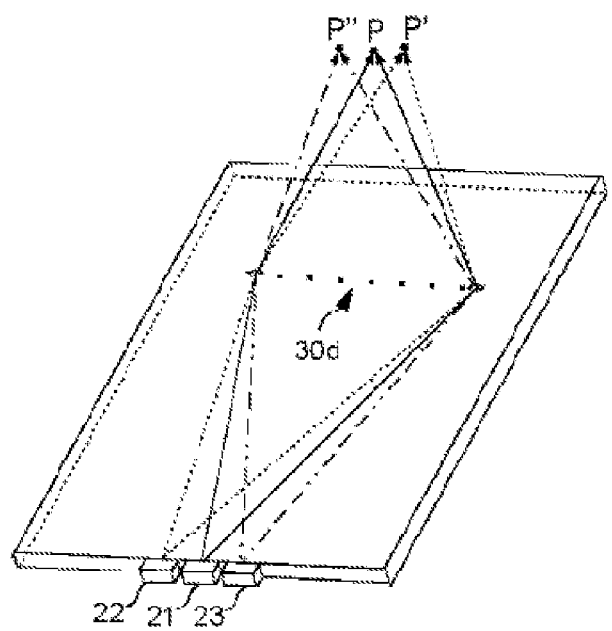
FIG. 2 is a perspective view schematically showing a situation in which fixed points of convergence of light emitted from a light convergence portion 30d shift depending on the light source.
Figure 2:
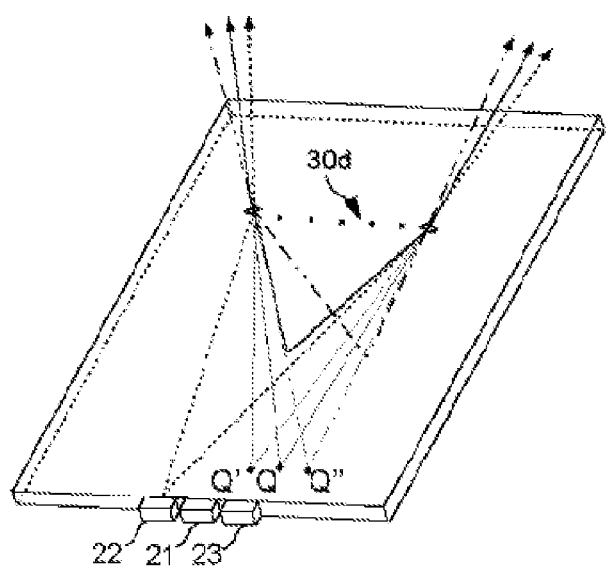

FIG. 2 is a perspective view schematically showing a situation in which fixed points of convergence of light emitted from the light convergence portion 30d shift depending on the light source. FIG. 2(a) schematically shows shifting of a fixed point (convergence point) on the observer side. FIG. 2(b) schematically shows shifting of a fixed point (scattering point) on the side opposite to the observer side.

When light emitted from the light source 21 enters the light convergence portion 30d, the light emitted from the light convergence portion 30d converges at a fixed point P. On the other hand, when light emitted from the light source 22 enters the light convergence portion 30d, the light emitted from the light convergence portion 30d converges at a fixed point P'. Also, when light emitted from the light source 23 enters the light convergence portion 30d, the light emitted from the light convergence portion 30d converges at a fixed point P''. Therefore, when the light emitted from the light source 21, the light emitted from the light source 22, and the light emitted from the light source 23 enter the light-guiding plate 70, the convergence of the light emitted from the light convergence portion 30d decreases. In particular, the farther the fixed point P is located from the light-guiding plate 70, the more the convergence of the emitted light decreases. Thus, there are cases where a point spaced apart from the light-guiding plate 70 looks blurred in the image formed by the display apparatus 10.

The same follows for a fixed point (scattering point) on the side opposite to the observer side. As shown in FIG. 2(b), when light emitted from the light source 21 enters the light convergence portion 30d, the light emitted from the light convergence portion 30d becomes light that appears to scatter from a fixed point Q. On the other hand, when light emitted from the light source 22 enters the light convergence portion 30d, the light emitted from the light convergence portion 30d becomes light that appears to scatter from a fixed point Q'. Also, when light emitted from the light source 23 enters the light convergence portion 30d, the light emitted from the light convergence portion 30d becomes light that appears to scatter from a fixed point Q''. Therefore, when light emitted from the light source 21, light emitted from light source 22, and light emitted from light source 23 enter the light-guiding plate 70, there are cases where a point spaced apart from the light-guiding plate 70 looks blurred in the image formed by the display apparatus 10.

Figure 3:
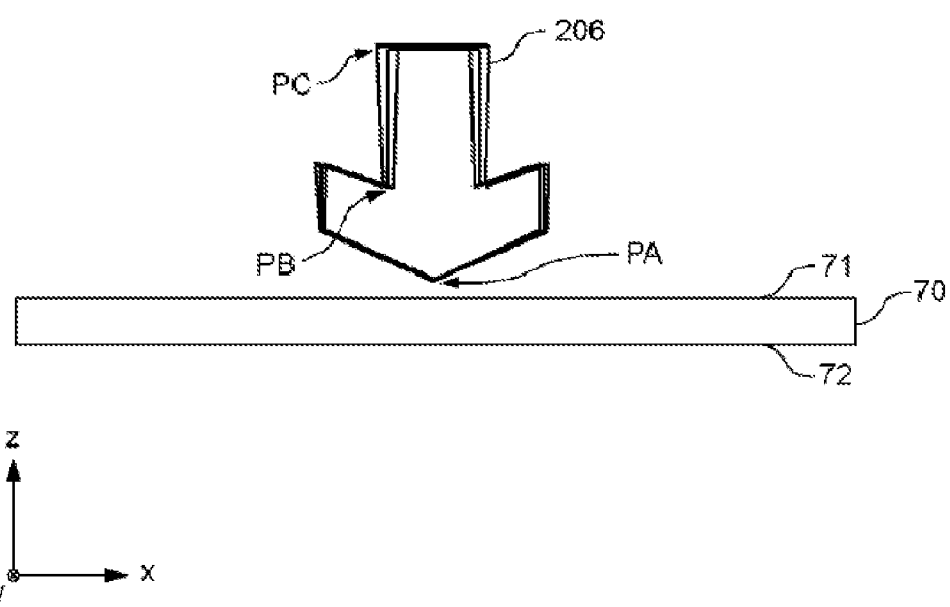
FIG. 3 shows an image 20b formed by some light convergence portions 30.

FIG. 3 shows an image 206 formed by some light convergence portions 30. The image 206 is an image in a case where each point is formed by one light convergence portion 30. For example, the image 206 is an image obtained by forming the fixed point PA with light emitted from the light convergence portion 30a, forming the fixed point PB with light emitted from the light convergence portion 30b, and forming the fixed point PC with light emitted from the light convergence portion 30c.

As shown in FIG. 3, among the fixed points PA, PB, and PC, the fixed point at which the image 206 has the maximum blur is the fixed point PC having the longest distance from the light-guiding plate 70. The fixed point at which the image 206 has the maximum blur is the fixed point PA having the shortest distance from the light-guiding plate 70. Thus, blur occurs differently in the one image 206, that is, the spread of the image changes.

Figure 4:
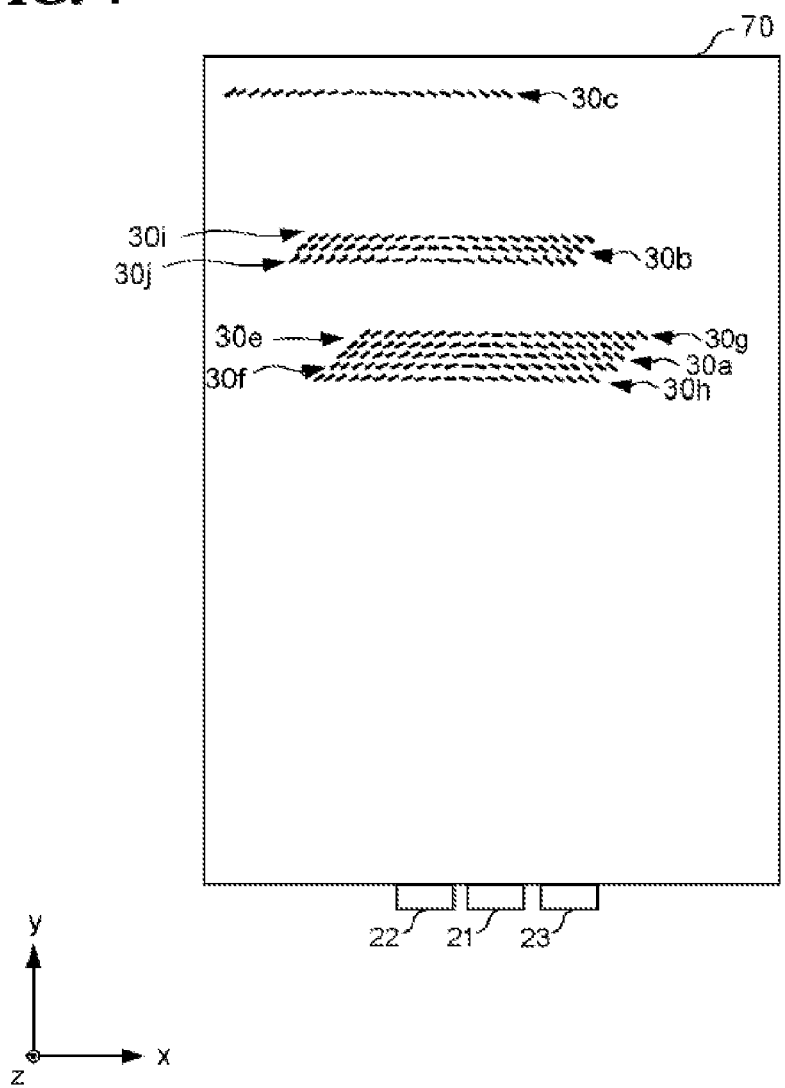
FIG. 4 schematically shows light convergence portions 30 corresponding to fixed points PA, PB, and PC on a light-guiding plate 70.

FIG. 4 schematically shows the light convergence portions 30 corresponding to the fixed points PA, PB, and PC on the light-guiding plate 70. The fixed point PC is formed by light emitted from only one light convergence portion 30c.

The fixed point PB is formed by light emitted from three light convergence portions 30 in total, namely, a light convergence portion 30i and a light convergence portion 30j, in addition to the light convergence portion 30b. The central positions of the light convergence portions 30b, 30i, and 30j are shifted in the direction (x-axis direction, for example) orthogonal to the direction in which the light-guiding plate 70 guides light. Thus, an image of the vicinity of the fixed point PB can be blurred in at least the x-axis direction.

Also, the fixed point PA is formed by light emitted from five light convergence portions 30 in total, namely, light convergence portions 30e to 30h, in addition to the light convergence portion 30a. The central positions of the light convergence portion 30a and the light convergence portions 30e to 30h are shifted in the direction (for example, in the x-axis direction) orthogonal to the direction in which the light-guiding plate 70 guides light. Thus, the image of the vicinity of the fixed point PA can be blurred in at least the x-axis direction.

Figure 5:
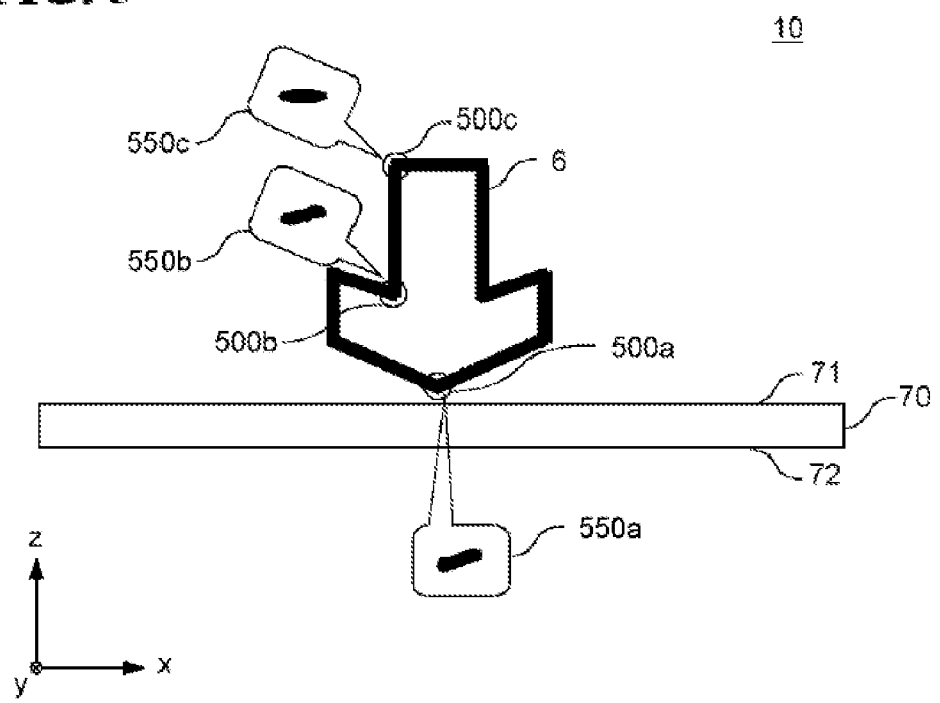
FIG. 5 illustratively shows blur of an image 6 displayed by the display apparatus 10.

FIG. 5 illustratively shows blur of the image 6 displayed by the display apparatus 10. As described with reference to FIG. 4, the image corresponding to the fixed point PA is formed by light emitted from five light convergence portions 30. Accordingly, as shown in an enlarged diagram 550a, the image of the vicinity of the fixed point PA is formed by five points having relatively small blur. The positions of these points are shifted from each other, and therefore the image in the vicinity of the fixed point PA looks blurred.

Also, the image corresponding to the fixed point PB is formed by light emitted from three light convergence portions 30 whose positions are shifted from each other. Accordingly, as shown in an enlarged diagram 550b, the image of the vicinity of the fixed point PB is formed by three points having relatively larger blur than that of the image at the fixed point PA. Since the positions of these points are shifted from each other, the image in the vicinity of the fixed point PB looks blurred.

On the other hand, the image corresponding to the fixed point PC is formed by light emitted from only the light convergence portion 30c. The image formed by light emitted from the light convergence portion 30c has a large spread. Therefore, as shown in an enlarged diagram 550c, the image of the vicinity of the fixed point PB looks blurred.

In this manner, according to the display apparatus 10, the closer the distance from the light-guiding plate 70 to a fixed point is, the higher the number of light convergence portions 30 at different positions that are used to emit light to form the fixed point. Thus, the image 6 is blurred, but it is possible to form the image 6 having approximately a constant blur amount, that is, having approximately a constant spread. Therefore, it is possible to reduce observer's discomfort.

Note that if the brightness of the image 6 needs to be constant, as the number of light convergence portions 30 that face a predetermined range including a fixed point increases, it is desired to reduce the luminous intensity of light emitted from each light convergence portion 30. For example, as in the above-described example, if the fixed point PC is formed by one light convergence portion 30c and the vicinity of the fixed point PA is formed by five light convergence portions 30, it is desired that the luminous intensity of light emitted from the five light convergence portions 30 that form the vicinity of the fixed point PA is about ⅕ the luminous intensity of light emitted from the light convergence portion 30c. In general, if the image of the vicinity of one fixed point is formed by light emitted from N light convergence portions 30, it is desired that the luminous intensity of light emitted from each light convergence portion is approximately inversely proportional to N. The luminous intensity of light emitted from the light convergence portion 30 may also be adjusted according to the area of the reflection surfaces of the light convergence portion 30.

Figure 6:
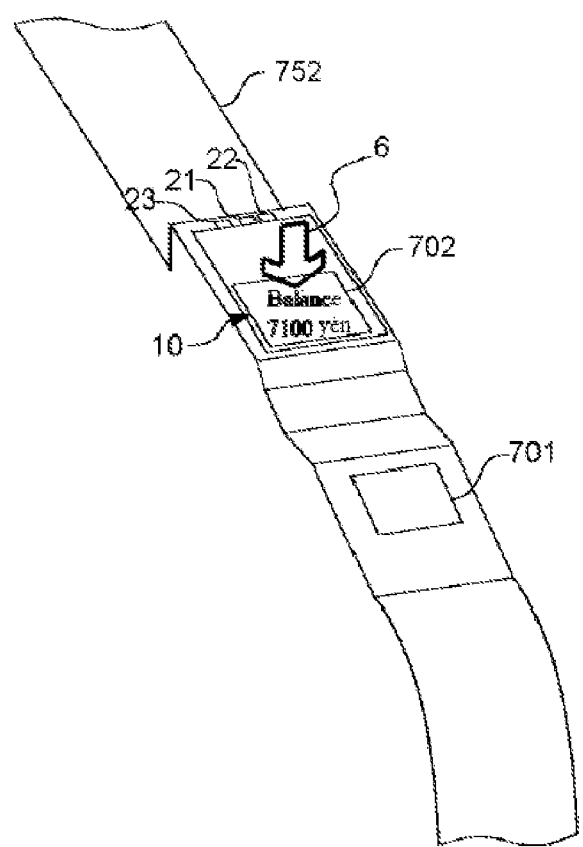
FIG. 6 schematically shows an application example in a case where the display apparatus 10 is utilized in a ticket gate.

FIG. 6 schematically shows a usage example in a case where the display apparatus 10 is utilized in a ticket gate. FIG. 6 is a schematic perspective view showing an overall ticket gate system 750. The ticket gate system 750 is an example of an optical system including the display apparatus 10.

The ticket gate system 750 includes a ticket gate main body 752 and the display apparatus 10. The ticket gate main body 752 has a communication unit 701 and a display unit 702. The communication unit 701 and the display unit 702 are examples of a user interface unit, and provide the interface between a user and the ticket gate main body 752.

The communication unit 701 utilizes near-field communication to communicate with a non-contact communication device held by a user. The communication unit 701 communicates with the non-contact communication device through near-field communication. Examples of the non-contact communication device include an IC card such as an IC card ticket and a mobile phone having a non-contact communication function. The display unit 702 displays information to a user. For example, the display unit 702 displays the balance of electronic money stored in the non-contact communication device.

The display apparatus 10 is provided on the display unit 702. The image 6 formed by the display apparatus 10 presents the position of the display unit 702 to the user. The user recognizes the image 6 as being located in a space above the display unit 702. As shown in FIG. 6, according to the display apparatus 10, the image 6 recognized in the space above the display unit 702 can be formed. Also, the overall display apparatus 10 is transparent, and thus the user can visually recognize a mark on the display unit 702.

Note that an image that is to show the user the position of the communication unit 701 may also be formed in the space located above the communication unit 701 by providing a display apparatus having a configuration similar to that of the display apparatus 10, on the communication unit 701.

Figure 7:
FIG. 7 schematically shows a light convergence portion 130 and a light convergence portion 132 as modifications of the light convergence portion 30.
Figure 7:
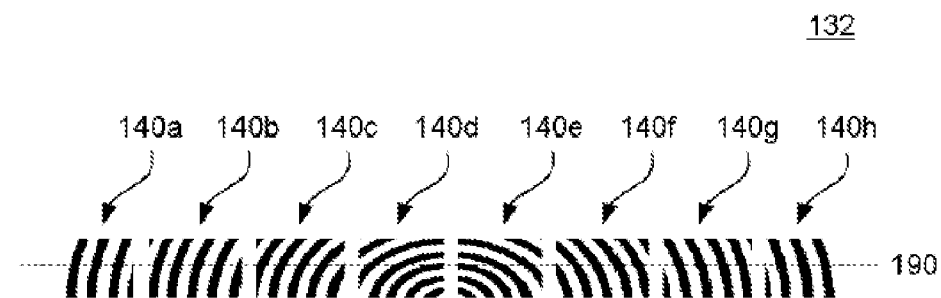

FIG. 7 schematically shows a light convergence portion 130 and a light convergence portion 132 as modifications of the light convergence portion 30. FIG. 7(a) schematically shows one light convergence portion 130 formed by a portion of a Fresnel lens. Note that a gap may also be provided between a plurality of refracting interfaces (prism planes) of the light convergence portion 130 that functions as the Fresnel lens.

The light convergence portion 132 shown in FIG. 7(b) corresponds to a plurality of portions 140a, 140b, 140c, 140d, 140e, 140f, 140g, and 140h that are obtained by dividing the light convergence portion 130 along the x-axis direction. Light emitted from the portions 140 of the light convergence portion 132 converges at the same fixed point. In this manner, by dividing the light convergence portion into the plurality of portions, a so-called black matrix effect occurs and the contrast of an image increases in some cases. Note that in addition to the reflection surface or the Fresnel lens, a diffraction grating may also be used as the light convergence portion 30.

Although the present invention was described by way of an embodiment, the technical scope of the present invention is not limited to the above-described embodiment. It is clear for a person skilled in the art that various changes or modifications can be added to the above-described embodiment. It is clear from the claims that embodiments to which such changes or modifications are added are also included in the technical scope of the present invention.

Note that the order of executing processes such as operations, procedures, steps, and stages in the apparatus, system, program, and method shown in the claims, specification, and drawings is not clearly stated, such as in particular, "before", "prior to", or the like, and the processes may be realized in any order unless the output of the former process is used in the later process. Even though operation flows in the claims, specification, and drawings are described using "first", "next", or the like for convenience, it does not mean that performing the operation flow in the stated order is essential.

INDEX TO THE REFERENCE NUMERALS

6 Image
10 Display apparatus
20 Light source portion
21, 22, 23 Light source
30 Light convergence portion
70 Light-guiding plate
71 Emission surface
72 Back surface
73, 74, 75, 76 End surface
130, 132 Light convergence portion
140 Portion
190 Line
701 Communication unit
702 Display unit
750 Ticket gate system
752 Ticket gate main body

The invention claimed is:

1. An optical device comprising:
a light-guiding plate that guides light that enters the light-guiding plate in a plane parallel to an emission surface that emits light; and
light sources that each emit light to the light-guiding plate from positions that are different in a direction orthogonal to a light-guiding direction in which the light-guiding plate guides light, wherein
the light-guiding plate comprises a plurality of light convergence portions that receive light guided by the light-guiding plate, each of the plurality of light convergence portions comprising optical surfaces that cause light to be emitted from the emission surface in directions in which the light substantially converges at one of a plurality of convergence points or one of a plurality of convergence lines in a space, or substantially scatters from one of a plurality of convergence points or one of a plurality of convergence lines in the space,
the plurality of convergence points or the plurality of convergence lines for the plurality of light convergence portions are different from each other, and an image is formed in the space by a collection of the plurality of the convergence points or the plurality of the convergence lines, and
among the plurality of light convergence portions, a first light convergence portion causes light to be emitted from the emission surface in directions in which the light substantially converges in a predetermined range comprising a point located a first distance from the emission surface, or substantially scatters from the predetermined range comprising the point located the first distance from the emission surface, and a second light convergence portion causes light to be emitted from the emission surface in directions in which the light substantially converges in a predetermined range comprising a point located a second distance, which is longer than the first distance, from the emission surface, or substantially scatters from the predetermined range comprising the point located the second distance from the emission surface, and the number of first light convergence portions is higher than the number of second light convergence portions such that a spread of an image formed by ones of the plurality of convergence points or ones of the plurality of convergence lines of the light emitted from the first light convergence portions approximately coincides with a spread of an image formed by ones of the plurality of convergence points or ones of the plurality of convergence lines of the light emitted from the second light convergence portions.

2. The optical device according to claim 1,
wherein the predetermined range comprises a range extending along a direction orthogonal to the light-guiding direction.

3. The optical device according to claim 1,
wherein the shorter the first distance is, the higher the number of first light convergence portions that are provided.

4. The optical device according to claim 1,
wherein the second light convergence portion causes light to be emitted from the emission surface in directions in which the light substantially converges at a convergence point among the plurality of convergence points or a convergence line among the plurality of convergence lines that is located farthest from the emission surface, or substantially scatters from the convergence point among the plurality of convergence points or the convergence line among the plurality of convergence lines that is located farthest from the emission surface,
the convergence point or the convergence line of the light emitted from the second light convergence portion has a spread in a direction orthogonal to the light-guiding direction in which the light-guiding plate guides the light, due to the light sources emitting light to the light-guiding plate at the different positions, and
the larger the spread of the convergence point or the convergence line of the light emitted from the second light convergence portion is, the higher the number of first light convergence portions that are provided.

5. The optical device according to claim 1,
wherein a plurality of first light convergence portions are provided at different positions in a direction orthogonal to the light-guiding direction.

6. The optical device according to claim 1,
wherein the image formed by the collection of the ones of the plurality of convergence points or the ones of the plurality of convergence lines is an image expressed by a line.

7. The optical device according to claim 1,
wherein the plurality of light convergence portions are formed along lines that are determined in advance in the plane parallel to the emission surface.

8. The optical device according to claim 1,
wherein the higher the number of light convergence portions that each cause light to be emitted from the emission surface in directions in which the light substantially converges in a predetermined range comprising a point located a specific distance apart from the emission surface, or substantially scatters from the predetermined range comprising the point located the specific distance apart from the emission surface is, the smaller a luminous intensity of emission light per light convergence portion in the plurality of light convergence portions is.

9. An optical system comprising:
the optical device according to claim 1; and
a user interface unit,
wherein the optical device forms the image that shows a user a position of the user interface unit.

\* \* \* \* \*